(12) United States Patent
Takanashi et al.

(10) Patent No.: US 10,340,525 B2
(45) Date of Patent: Jul. 2, 2019

(54) NON-AQUEOUS ELECTROLYTE SECONDARY BATTERY POSITIVE ELECTRODE AND NON-AQUEOUS ELECTROLYTE SECONDARY BATTERY

(71) Applicant: SANYO Electric Co., Ltd., Daito-shi, Osaka (JP)

(72) Inventors: Yuu Takanashi, Hyogo (JP); Fumiharu Niina, Hyogo (JP); Atsushi Fukui, Hyogo (JP); Takahiro Isono, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/541,868

(22) PCT Filed: Jan. 21, 2016

(86) PCT No.: PCT/JP2016/000299
§ 371 (c)(1),
(2) Date: Jul. 6, 2017

(87) PCT Pub. No.: WO2016/121350
PCT Pub. Date: Aug. 4, 2016

(65) Prior Publication Data
US 2018/0019473 A1 Jan. 18, 2018

(30) Foreign Application Priority Data
Jan. 30, 2015 (JP) .................................. 2015-017290

(51) Int. Cl.
*H01M 4/02* (2006.01)
*H01M 4/62* (2006.01)
(Continued)

(52) U.S. Cl.
CPC ............ *H01M 4/628* (2013.01); *C01G 53/40* (2013.01); *C01G 53/50* (2013.01); *H01M 4/131* (2013.01);
(Continued)

(58) Field of Classification Search
CPC ...................................................... H01M 4/131
(Continued)

(56) References Cited

U.S. PATENT DOCUMENTS 5,962,167 A    10/1999  Nakai et al.
2007/0082265 A1  4/2007  Itou et al.
(Continued)

FOREIGN PATENT DOCUMENTS

JP    10-154532 A    6/1998
JP    2005-190996 A  7/2005
(Continued)

OTHER PUBLICATIONS

International Search Report dated Apr. 19, 2016, issued in counterpart International Application No. PCT/JP2016/000299 (1 page).

*Primary Examiner* — Khanh T Nguyen
(74) *Attorney, Agent, or Firm* — Westerman, Hattori, Daniels & Adrian, LLP

(57) ABSTRACT

A non-aqueous electrolyte secondary battery positive electrode capable of suppressing a decomposition reaction of an electrolyte solution in an overcharged state is provided. A non-aqueous electrolyte secondary battery positive electrode according to this embodiment includes a positive electrode active material layer which includes a positive electrode active material (54) containing a lithium transition metal oxide, a tungsten compound (56), a phosphoric acid compound (58) not in contact with the positive electrode active
(Continued)

material (54), and an electrically conductive agent (52) in contact with the tungsten compound (56) and the phosphoric acid compound (58).

9 Claims, 4 Drawing Sheets

(51) Int. Cl.
    *H01M 4/131*     (2010.01)
    *H01M 4/505*     (2010.01)
    *H01M 4/525*     (2010.01)
    *C01G 53/00*     (2006.01)
    *H01M 10/0587*     (2010.01)

(52) U.S. Cl.
    CPC .......... *H01M 4/505* (2013.01); *H01M 4/525* (2013.01); *H01M 4/62* (2013.01); *H01M 4/623* (2013.01); *H01M 4/625* (2013.01); *H01M 10/0587* (2013.01); *C01P 2002/52* (2013.01); *C01P 2004/61* (2013.01); *C01P 2006/40* (2013.01); *H01M 2004/028* (2013.01)

(58) Field of Classification Search
    USPC ........................................................ 429/188
    See application file for complete search history.

(56) References Cited

U.S. PATENT DOCUMENTS

| | | | |
|---|---|---|---|
| 2009/0087739 A1* | 4/2009 | Takahashi | H01M 4/131 429/188 |
| 2013/0177812 A1 | 7/2013 | Han et al. | |
| 2015/0056512 A1 | 2/2015 | Takeuchi et al. | |

FOREIGN PATENT DOCUMENTS

| | | |
|---|---|---|
| JP | 2013-84395 A | 5/2013 |
| JP | 2013-143380 A | 7/2013 |
| JP | WO2013/145846 A1 | 10/2013 |
| JP | 2014-13727 A | 1/2014 |

\* cited by examiner

NON-AQUEOUS ELECTROLYTE SECONDARY BATTERY POSITIVE ELECTRODE AND NON-AQUEOUS ELECTROLYTE SECONDARY BATTERY

TECHNICAL FIELD

The present invention relates to techniques of a non-aqueous electrolyte secondary battery positive electrode and a non-aqueous electrolyte secondary battery.

BACKGROUND ART

In recent years, reduction in size and reduction in weight of mobile information terminals, such as a mobile phone, a notebook personal computer, and a smart phone, have been rapidly advanced, and a secondary battery used as a drive power source thereof has been further required to have a higher capacity. Since a non-aqueous electrolyte secondary battery which performs charge and discharge by transfer of lithium ions between a positive electrode and a negative electrode in association with charge and discharge has a high energy density and a high capacity, the secondary battery described above has been widely used as a drive power source of the mobile information terminal as described above.

Furthermore, recently, the non-aqueous electrolyte secondary battery has also drawn attention as a motive power source for an electric tool, an electric vehicle (EV), a hybrid electric vehicle (HEV or PHEV), or the like, and has been expected to be widely used in various fields.

Although the non-aqueous electrolyte secondary battery is used in a predetermined operational voltage range, if the operation is performed in an overcharged state beyond the voltage range, reactivity between a positive electrode and an electrolyte solution is increased. Accordingly, since decomposition of the positive electrode and an oxidation decomposition reaction of the electrolyte solution (non-aqueous electrolyte) occur, gas is generated, and the inside pressure of the battery is increased. When this state continues, for example, by Joule heat generation caused by an increase in internal resistance and a reaction heat caused by a chemical reaction between a decomposition product of the electrolyte solution and the positive electrode, the temperature of the battery is rapidly increased. As a result, problems, such as degradation in characteristics and safety of the battery, may arise.

In order to solve the problems as described above, for example, PTL 1 has suggested that by addition of a phosphoric acid compound to a non-aqueous electrolyte secondary battery positive electrode, an increase in battery temperature caused by a chemical reaction of an electrolyte solution in an overcharged state is suppressed.

In addition, PTL 2 has suggested that by adhering a phosphoric acid compound to the surface of a positive electrode active material, decomposition of an electrolyte solution in a high-temperature overcharged state is suppressed, and gas generation is suppressed.

CITATION LIST

Patent Literature

PTL 1: Japanese Published Unexamined Patent Application No. 10-154532

PTL 2: Japanese Published Unexamined Patent Application No. 2005-190996

SUMMARY OF INVENTION

Technical Problem

However, in the non-aqueous electrolyte secondary battery positive electrodes disclosed in the above PTLs 1 and 2, although the reaction between the positive electrode active material and the electrolyte solution in an overcharged state can be suppressed, a reaction between an electrically conductive agent contained in the positive electrode and the electrolyte solution cannot be sufficiently suppressed. As a result, a problem in that the decomposition reaction of the electrolyte solution cannot be sufficiently suppressed may occur.

Hence, the present invention aims to provide a non-aqueous electrolyte secondary battery positive electrode capable of suppressing a decomposition reaction of an electrolyte solution in an overcharged state and a non-aqueous electrolyte secondary battery including the above non-aqueous electrolyte secondary battery positive electrode.

Solution to Problem

A non-aqueous electrolyte secondary battery positive electrode according to one aspect of the present invention comprises a positive electrode active material layer which includes a positive electrode active material containing a lithium transition metal oxide, a tungsten compound, a phosphoric acid compound not in contact with the positive electrode active material, and an electrically conductive agent in contact with the tungsten compound and the phosphoric acid compound.

Advantageous Effects of Invention

According to the non-aqueous electrolyte secondary battery positive electrode of one aspect of the present invention, the decomposition reaction of an electrolyte solution in an overcharged state can be suppressed.

DESCRIPTION OF EMBODIMENT

An embodiment of the present invention will be described. This embodiment is one example of carrying out the present invention, and the present invention is not limited to this embodiment.

Figure 1:
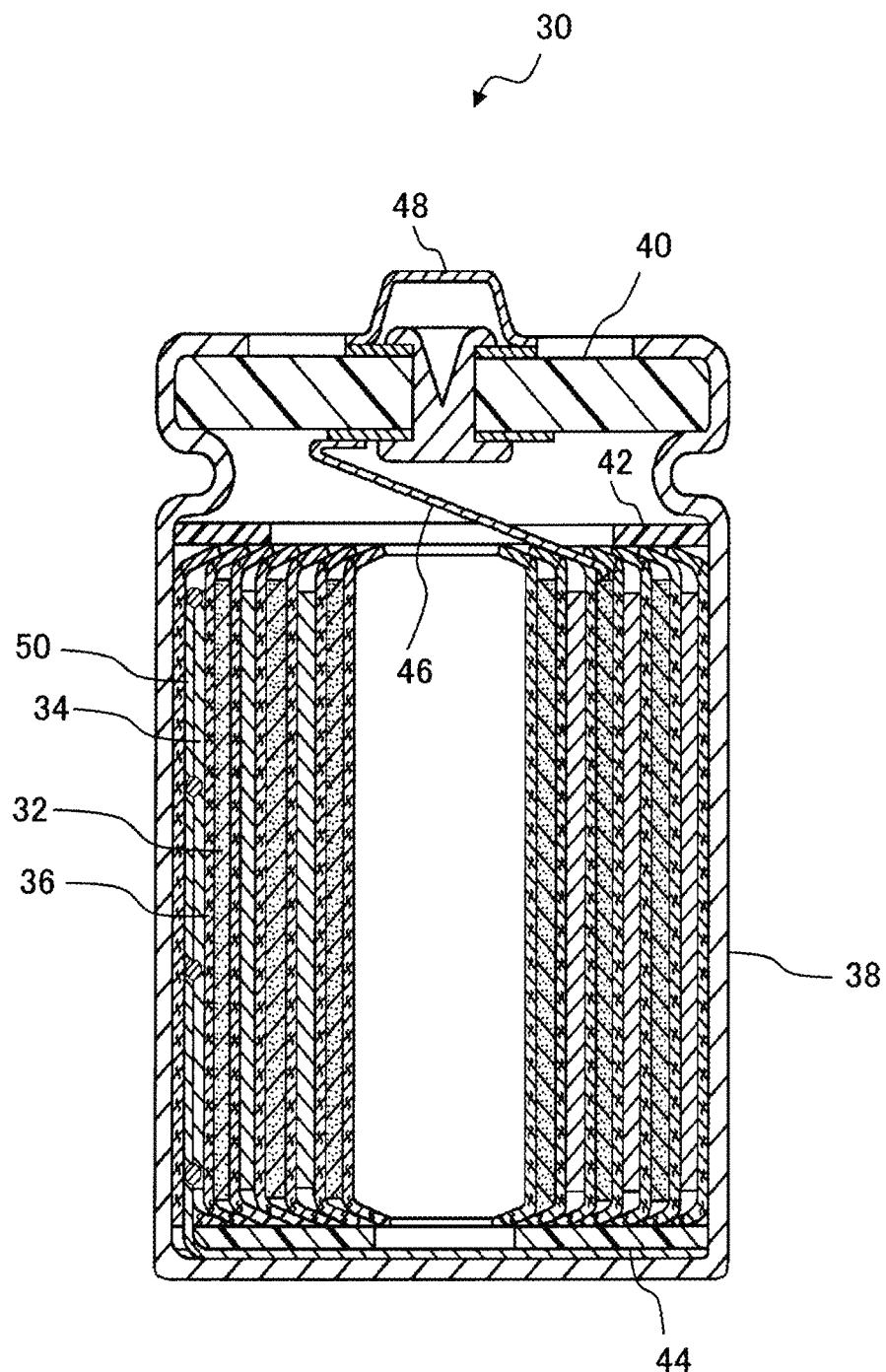
FIG. 1 is a schematic cross-sectional view of a non-aqueous electrolyte secondary battery which is one example of this embodiment.

FIG. 1 is a schematic cross-sectional view of a non-aqueous electrolyte secondary battery which is one example of this embodiment. As shown in FIG. 1, a non-aqueous electrolyte secondary battery 30 includes a positive electrode 32, a negative electrode 34, at least one non-aqueous electrolyte secondary battery separator 36 (hereinafter, simply referred to as the "separator 36") interposed between the positive electrode 32 and the negative electrode 34, and a non-aqueous electrolyte (not shown). The positive electrode 32 and the negative electrode 34 are wound with the separator 36 interposed therebetween to form a wound type electrode group together with the separator 36. The non-aqueous electrolyte secondary battery 30 includes a cylindrical type battery case 38 and a sealing plate 40, and the wound type electrode group and the non-aqueous electrolyte are received in the battery case 38. Two end portions of the wound type electrode group in a longitudinal direction are provided with an upper insulating plate 42 and a lower insulating plate 44. One end of a positive electrode lead 46 is connected to the positive electrode 32, and the other end of the positive electrode lead 46 is connected to a positive electrode terminal 48 provided for the sealing plate 40. One end of a negative electrode lead 50 is connected to the negative electrode 34, and the other end of the negative electrode lead 50 is connected to an inside bottom of the battery case 38. The sealing plate 40 is caulked at an open end portion of the battery case 38, so that the battery case 38 is sealed.

In the example shown in FIG. 1, although a cylindrical battery including the wound type electrode group is shown, the application of the present disclosure is not limited thereto. As for the shape of the battery, for example, there may be mentioned a square battery, a flat battery, a coin battery, or a laminate film pack battery.

Hereinafter, individual members of the non-aqueous electrolyte secondary battery 1 of this embodiment will be described.

<Positive Electrode>

The positive electrode 32 is formed, for example, of a positive electrode collector, such as metal foil, and a positive electrode active material layer formed on the positive electrode collector. For the positive electrode collector, for example, there may be used foil formed of a metal, such as aluminum, stable in a positive electrode potential range or a film having a surface layer on which the metal mentioned above is disposed.

The positive electrode active material layer of this embodiment contains a positive electrode active material containing a lithium transition metal oxide, a tungsten compound, a phosphoric acid compound not in contact with the positive electrode active material, and an electrically conductive agent in contact with the tungsten compound and the phosphoric acid compound.

Hereinafter, the contact relationship among the positive electrode active material, the electrically conductive agent, the tungsten compound, and the phosphoric acid compound will be described in detail with reference to the drawings.

Figure 2A:
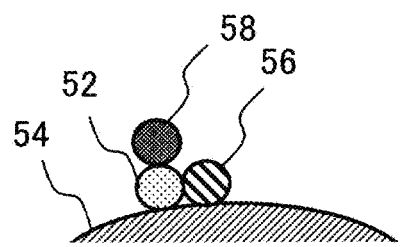
FIGS. 2(A) to 2(C) are each a schematic cross-sectional view showing a contact relationship among a positive electrode active material, an electrically conductive agent, a tungsten compound, a phosphoric acid compound, each of which forms a positive electrode active material layer of this embodiment.
Figure 2B:
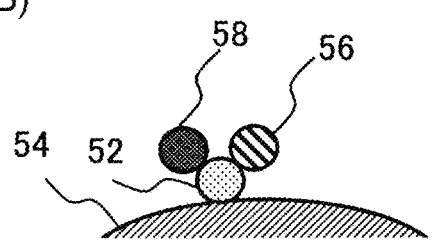
Figure 2C:
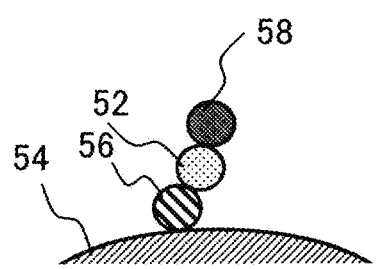

FIGS. 2(A) to 2(C) are each a schematic cross-sectional view showing one example of the contact relationship among the positive electrode active material, the electrically conductive agent, the tungsten compound, and the phosphoric acid compound, each of which forms the positive electrode active material layer of this embodiment. As shown in FIG. 2(A), an electrically conductive agent 52 is in contact with a tungsten compound 56 and a phosphoric acid compound 58. In addition, the phosphoric acid compound 58 in contact with the electrically conductive agent 52 is not in contact with the positive electrode active material 54. The positive electrode active material 54, the electrically conductive agent 52, the tungsten compound 56, and the phosphoric acid compound 58 each represent a grain, and those grains may be either primary grains or secondary grains. In this embodiment, the contact means the contact between the grains.

In FIG. 2(A), although the state in which the tungsten compound 56 and the electrically conductive agent 52 are in contact with the positive electrode active material 54 is shown, as shown in FIG. 2(B), the electrically conductive agent 52 may be in contact with the positive electrode active material 54, and the tungsten compound 56 may be not in contact with the positive electrode active material 54, or as shown in FIG. 2(C), the tungsten compound 56 may be in contact with the positive electrode active material 54, and the electrically conductive agent 52 may be not in contact with the positive electrode active material 54. Furthermore, in FIG. 2, although the state in which at least one of the electrically conductive agent 52 and the tungsten compound 56 is in contact with the positive electrode active material 54 is shown by way of example, when the electrically conductive agent 52 is in contact with the tungsten compound 56 and the phosphoric acid compound 58, and the phosphoric acid compound 58 is not in contact with the positive electrode active material 54, the electrically conductive agent 52 and the tungsten compound 56 may be not in contact with the positive electrode active material 54. In addition, when the positive electrode active material layer of this embodiment includes the positive electrode active material 54, the electrically conductive agent 52, the tungsten compound 56, and the phosphoric acid compound 58, which satisfy the above contact relationship, a positive electrode active material, an electrically conductive agent, a tungsten compound, and a phosphoric acid compound, which do not satisfy the above contact relationship, may also be included.

In addition, since the positive electrode active material layer of this embodiment includes a positive electrode active material containing a lithium transition metal oxide, a tungsten compound, a phosphoric acid compound not in contact with the positive electrode active material, and an electrically conductive agent in contact with the tungsten compound and the phosphoric acid compound, a decomposition reaction (side reaction) of an electrolyte solution in an overcharged state can be suppressed.

Although the mechanism of suppressing a decomposition reaction of an electrolyte solution in an overcharged state has not been clearly understood, the following reasons may be considered.

The decomposition reaction of an electrolyte solution in an overcharged state is caused, for example, by a reaction between the positive electrode active material 54 and the electrolyte solution and a reaction between the electrically conductive agent 52 and the electrolyte solution. In addition, as is the case of this embodiment, since the electrically conductive agent 52 in contact with the tungsten compound 56 and the phosphoric acid compound 58 is present, and the phosphoric acid compound 58 in contact with the electrically conductive agent 52 is not in contact with the positive electrode active material 54, the tungsten compound 56 is believed to function as a reverse catalyst which mainly suppresses the reaction between the electrolyte solution and the electrically conductive agent 52. As a result, it is believed that the decomposition reaction of the electrolyte solution in an overcharged state can be suppressed. In addition, it is believed that since the phosphoric acid compound 58 is in contact with the electrically conductive agent 52, the contact area between the electrically conductive agent 52 and the electrolyte solution is decreased, and the decomposition reaction of the electrolyte solution caused by the reaction between the electrolyte solution and the electrically conductive agent 52 can be suppressed. In addition, it is believed that the decomposition reaction of the electrolyte solution in an overcharged state is more influenced by the reaction between the electrically conductive agent 52 and the electrolyte solution than the reaction between the positive electrode and the electrolyte solution. Hence, when the reaction between the electrically conductive agent 52 and the electrolyte solution is suppressed, the decomposition reaction of the electrolyte solution in an overcharged state can be sufficiently suppressed. However, when the phosphoric acid compound is in contact with the positive electrode active material, the phosphoric acid compound and the positive electrode active material react with each other in an overcharged state, and the phosphoric acid compound is decomposed, so that the amount of the phosphoric acid compound necessary to enable the tungsten compound to sufficiently perform a reverse catalytic function is decreased. Accordingly, even when the electrically conductive agent in contact with the tungsten compound and the phosphoric acid compound is present, if the phosphoric acid compound is in contact with the positive electrode active material, an effect of suppressing the decomposition reaction of the electrolyte solution in an overcharged state cannot be sufficiently obtained.

The reverse catalytic function of the tungsten compound 56 described above is an interaction obtained when the phosphoric acid compound 58 and the tungsten compound 56 coexist, and it is believed that only by the tungsten compound 56 itself, the reverse catalytic function of suppressing the reaction between the electrolyte solution and the electrically conductive agent 52 cannot be obtained. In addition, even when the phosphoric acid compound 58 and the tungsten compound 56 coexist, it is believed that in the state in which the phosphoric acid compound 58 is in contact with the positive electrode active material 54, the reverse catalytic function of the tungsten compound 56 of suppressing the reaction between the electrolyte solution and the electrically conductive agent 52 cannot be sufficiently obtained. In addition, it is believed that in the state in which the phosphoric acid compound 58 is in contact with the positive electrode active material 54, the contact area between the electrically conductive agent 52 and the electrolyte solution cannot be sufficiently decreased, and the reaction between the electrolyte solution and the electrically conductive agent 52 cannot be sufficiently suppressed. Hence, the decomposition reaction of the electrolyte solution in an overcharged state cannot be sufficiently suppressed.

In addition, although the case is shown in which the tungsten compound 56 shown in FIG. 2(A) is in contact with the electrically conductive agent 52 and the positive electrode active material 54, as long as the tungsten compound 56 is in contact with the electrically conductive agent 52, the contact with the other materials is not particularly limited. For example, the tungsten compound 56 may be in contact with the phosphoric acid compound 58 and/or may be in contact with an electrically conductive agent not in contact with the positive electrode active material 54. In addition, as long as the phosphoric acid compound 58 shown in FIG. 2(A) is in contact with the electrically conductive agent 52 and is not in contact with the positive electrode active material 54, the contact with the other materials is not particularly limited.

In addition, as long as the tungsten compound 56 shown in FIG. 2(B) is in contact with the electrically conductive agent 52, the contact with the other materials is not particularly limited, and for example, the tungsten compound 56 may be in contact with the phosphoric acid compound 58 and/or may be in contact with an electrically conductive agent not in contact with the positive electrode active material 54. In addition, as long as the phosphoric acid compound 58 shown in FIG. 2(B) is in contact with the electrically conductive agent 52 and is not in contact with the positive electrode active material 54, the contact with the other materials is not particularly limited.

In addition, although the case is shown in which the tungsten compound 56 shown in FIG. 2(C) is in contact with the positive electrode active material 54 and the electrically conductive agent 52, as long as the tungsten compound 56 is in contact with the electrically conductive agent 52, the contact with the other materials is not particularly limited, and for example, the tungsten compound 56 may be in contact with the phosphoric acid compound 58 and/or may be in contact with an electrically conductive agent not in contact with the positive electrode active material 54. In addition, when the phosphoric acid compound 58 shown in FIG. 2(C) is in contact with the electrically conductive agent 52 and is not in contact with the positive electrode active material 54, the contact with the other materials is not particularly limited.

As described above, in this embodiment, when the electrically conductive agent 52 is in contact with the tungsten compound 56 and the phosphoric acid compound 58, and the phosphoric acid compound 58 is not in contact with the positive electrode active material 54, the electrically conductive agent 52 and the tungsten compound 56 may be not in contact with the positive electrode active material 54; however, in view of the reverse catalytic function and the like, as shown in FIGS. 2(A) to 2(C), at least one of the electrically conductive agent 52 and the tungsten compound 56 is preferably in contact with the positive electrode active material 54.

Hereinafter, although one example of a method for forming a positive electrode active material layer of this embodiment will be described, the method is not limited to the following formation method.

First, a positive electrode active material and an electrically conductive agent are wet-mixed with each other (if necessary, a binder is added), so that a positive electrode mixture slurry A is obtained. Accordingly, the electrically conductive agent can be adhered to the positive electrode active material. Subsequently, a tungsten compound and a phosphoric acid compound are added to and then mixed with the positive electrode mixture slurry A, so that a positive electrode mixture slurry B is obtained. Accordingly, the tungsten compound and the phosphoric acid compound can be adhered to the electrically conductive agent adhered to the positive electrode active material (the phosphoric acid compound not adhered to the positive electrode active material can be obtained). In addition, the positive electrode mixture slurry B is applied onto a surface of a positive electrode collector and is then dried and rolled, so that a positive electrode active material layer is formed.

As another example, first, a mixture formed by dry mixing of a positive electrode active material and a tungsten compound is wet-mixed with an electrically conductive agent (if necessary, a binder is added), so that a positive electrode mixture slurry A is obtained. Accordingly, the tungsten compound and the electrically conductive agent can be adhered to the positive electrode active material. Next, a phosphoric acid compound is added to and then mixed with the positive electrode mixture slurry A, so that a positive electrode mixture slurry B is obtained. Accordingly, a phosphoric acid compound not adhered to the positive electrode active material but adhered to the electrically conductive agent can be obtained. Furthermore, in this method, for example, when the addition amount of the tungsten compound is adjusted, an electrically conductive agent not adhered to the positive electrode active material but adhered to the tungsten compound may also be obtained.

Hereinafter, individual materials forming the positive electrode active material layer will be described.

Although the tungsten compound is not particularly limited, for example, a tungsten oxide, a tungsten halide, a tungsten nitride, or a tungsten carbide may be used, and a mixture containing at least two types of those mentioned above may also be used. Among the above compounds, for example, in view of the reverse catalytic function of suppressing the reaction between an electrolyte solution and an electrically conductive agent, a tungsten oxide is preferably used, and furthermore, hexavalent tungsten oxide ($WO_3$) having the most stable oxidation number of tungsten is more preferably used.

The tungsten compound is preferably in contact with the positive electrode active material in view of the reverse catalytic function, and furthermore, the electrically conductive agent is preferably in contact with this tungsten compound. In addition, the tungsten compound in contact with the positive electrode active material is preferably scattered (dispersed) in the positive electrode active material and is more preferably uniformly scattered (dispersed) in the positive electrode active material.

When the amount of the tungsten compound contained in the positive electrode active material layer is small, the reverse catalytic function of the tungsten compound may not be sufficiently obtained in some cases, and when the amount of the tungsten compound is excessively increased, since the positive electrode active material is widely covered with the tungsten compound (covering portion thereof is excessively increased), charge and discharge characteristics of the battery may be degraded in some cases. Accordingly, for example, in view of the effect of the reverse catalytic function and the charge and discharge characteristics of the battery, the total amount of the tungsten compound in the positive electrode active material layer is preferably 0.05 to 10 percent by mole with respect to the total amount of the transition metal in the positive electrode active material.

The grain diameter of the tungsten compound is preferably 0.05 to 5 μm and more preferably 0.1 to 1 μm. When the grain diameter is in the range described above, the contact area with the electrically conductive agent is increased, and the interaction between the phosphoric acid compound and the tungsten compound can be sufficiently obtained. In this embodiment, the grain diameter of the tungsten compound is obtained in such a way that after 100 grains of the tungsten compound observed using a scanning electron microscope (SEM) are randomly extracted, the lengths of the major axes and the lengths of the minor axes of the individual grains are measured and then averaged.

The phosphoric acid compound is not particularly limited, and for example, lithium phosphate, lithium dihydrogen phosphate, cobalt phosphate, nickel phosphate, manganese phosphate, potassium phosphate, calcium phosphate, sodium phosphate, magnesium phosphate, ammonium phosphate, or ammonium dihydrogen phosphate may be used. In addition, at least two types of those compounds mentioned above may be used by mixing. Among those compounds mentioned above, lithium phosphate which is most stable in terms of the stabilization of the phosphoric acid compound in an overcharged state is preferable.

The phosphoric acid compound in contact with the electrically conductive agent and not in contact with the positive electrode active material is preferably scattered (dispersed) in the electrically conductive agent and is more preferably uniformly scattered (dispersed) in the electrically conductive agent.

When the amount of the phosphoric acid compound contained in the positive electrode active material layer is small, the interaction between the phosphoric acid compound and the tungsten compound may not be sufficiently obtained, and as a result, the effect of the reverse catalytic function of the tungsten compound may also not be sufficiently obtained in some cases. In addition, when the amount of the phosphoric acid compound in the positive electrode active material layer is excessively increased, since the surface of the electrically conductive agent is widely covered with the phosphoric acid compound (covering portion thereof is excessively increased), the charge and discharge characteristics of the battery may be degraded in some cases. Accordingly, for example, in view of the effect of the reverse catalytic function and the charge and discharge characteristics of the battery, the total amount of the phosphoric acid compound in the positive electrode active material layer is preferably 0.1 to 5.0 percent by mass with respect to the total amount of the positive electrode active material.

In addition, for example, in order to sufficiently obtain the interaction between the phosphoric acid compound and the tungsten compound, the rate of the phosphoric acid compound in contact with the electrically conductive agent and not in contact with the positive electrode active material is preferably 50% or more with respect to the total amount of the phosphoric acid compound contained in the positive electrode active material layer. When the rate of the phosphoric acid compound in contact with the electrically conductive agent and not in contact with the positive electrode active material is less than 50 percent by mass, since the rate of a phosphoric acid compound in contact with the positive electrode active material to the phosphoric acid compound contained in the positive electrode active material layer is increased. Accordingly, since the interaction between the phosphoric acid compound and the tungsten compound cannot be sufficiently obtained, the effect of the above reverse catalytic function may not be sufficiently obtained in some cases, and/or since the contact area between the electrically conductive agent and the electrolyte solution is increased, the reaction between the electrically conductive agent and the electrolyte solution may not be sufficiently suppressed in some cases.

The rate of the phosphoric acid compound in contact with the surface of the electrically conductive agent and not in contact with the positive electrode active material (hereinafter, referred to as the "non-contact rate of phosphoric acid compound (%)" in some cases) can be obtained as described below. The positive electrode active material layer is observed by a cross-sectional SEM, and in a region corresponding to 100 μm×100 μm, a number (A) of the phosphoric acid compound in contact with the electrically conductive agent and not in contact with the positive electrode active material is obtained. The number thus obtained is divided by a number (B) of a phosphoric acid compound present in the region corresponding to 100 μm×100 μm, so that the non-contact rate of the phosphoric acid compound can be obtained.

Non-contact rate of phosphoric acid compound
(%)=A/B

Figure 3:
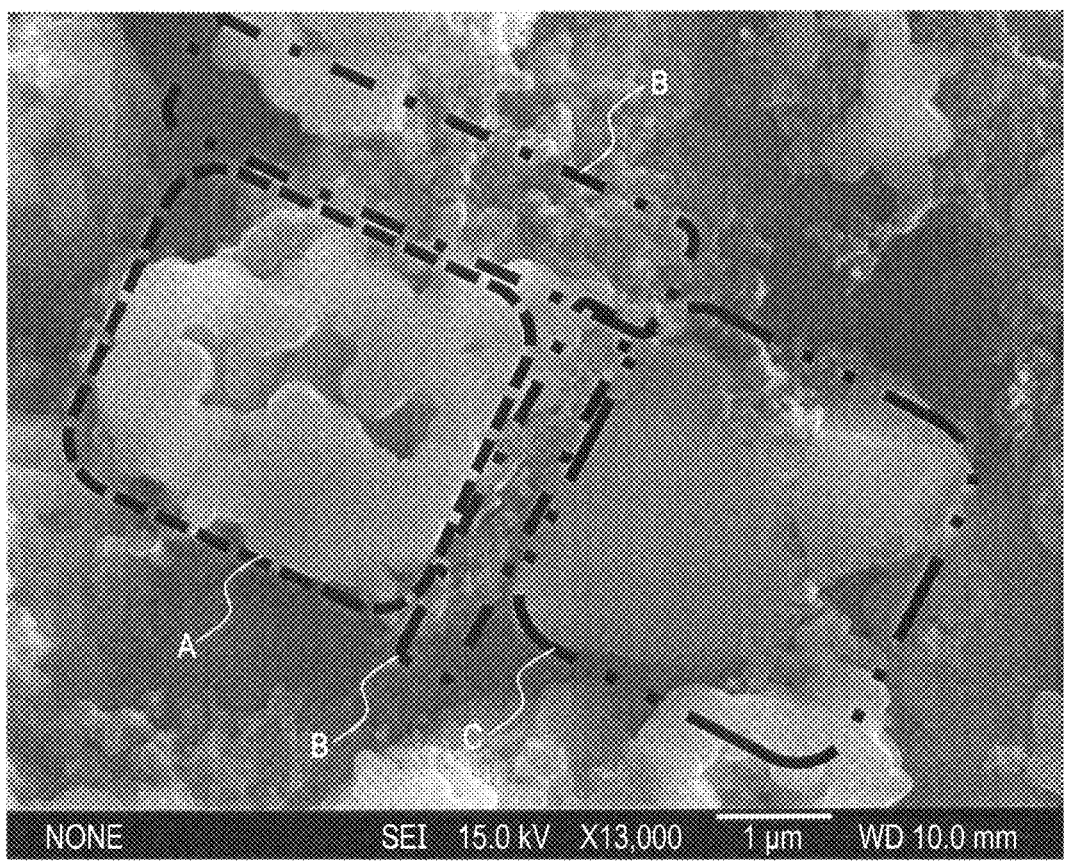
FIG. 3 is view showing a SEM image of a cross-section of lithium phosphate which is not in contact with the positive electrode active material.
Figure 4:
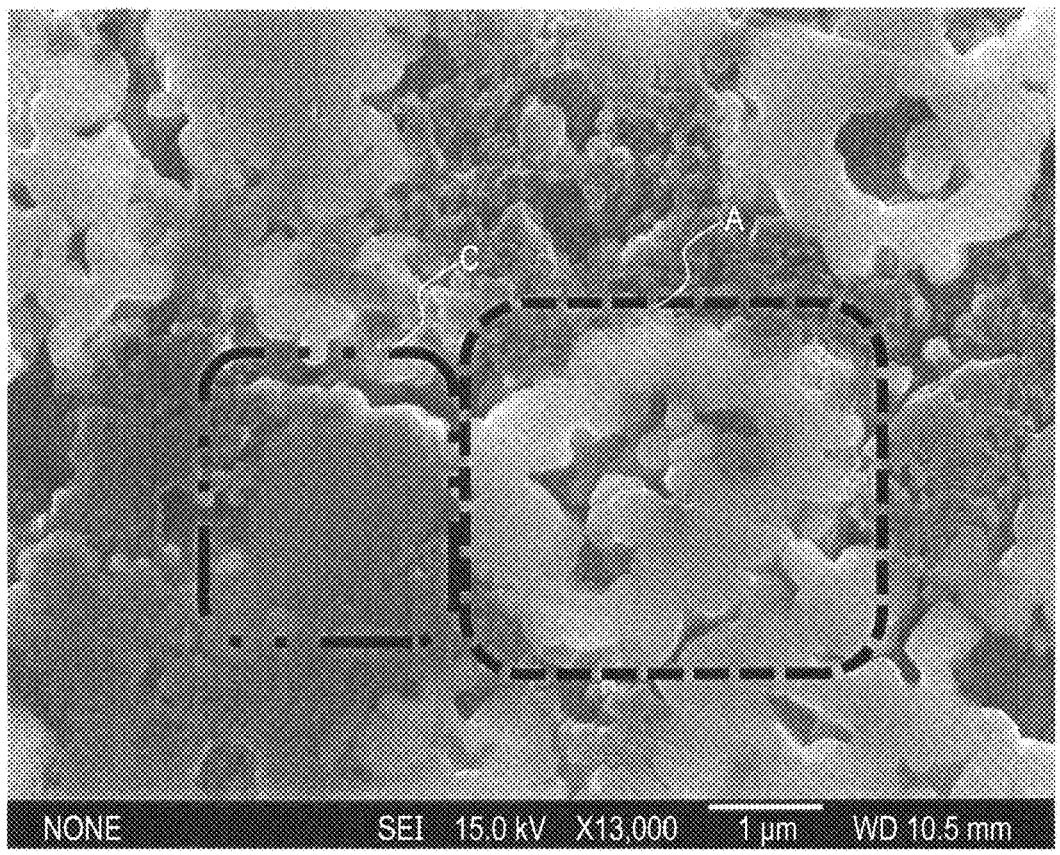
FIG. 4 is a view showing a SEM image of a cross-section of lithium phosphate which is in contact with the positive electrode active material.

As one example, a cross-sectional SEM of a phosphoric acid compound not in contact with a positive electrode active material is shown in FIG. 3. In addition, a cross-sectional SEM of a phosphoric acid compound in contact with a positive electrode active material is shown in FIG. 4. A dash line frame A shown in each of FIGS. 3 and 4 indicates the positive electrode active material, a chain line frame B indicates an electrically conductive agent, and a two-dot chain line frame C indicates the phosphoric acid compound. In FIG. 3, between the positive electrode active material (dash line frame A) and the phosphoric acid compound (two-dot chain line frame C), the electrically conductive agent (chain line frame B) is present, and the phosphoric acid compound is not in contact with the positive electrode active material. On the other hand, in FIG. 4, between the phosphoric acid compound and the positive electrode active material, the electrically conductive agent is not present, and the phosphoric acid compound and the positive electrode active material are in contact with each other.

The grain diameter of the phosphoric acid compound is preferably 0.1 to 10 μm and more preferably 0.5 to 5 μm. When the grain diameter is in the range described above, the contact area with the electrically conductive agent is increased, and the interaction between the phosphoric acid compound and the tungsten compound may be sufficiently obtained. In this case, the grain diameter of the phosphoric acid compound is obtained in such a way that after 100 grains of the phosphoric acid compound observed using a scanning electron microscope (SEM) are randomly extracted, the lengths of the major axes and the lengths of the minor axes of the individual grains are measured and then averaged.

Any lithium transition metal oxide may be used without any particular restriction as long being used as a generally known positive electrode active material, and for example, there may be mentioned a lithium transition metal oxide represented by a general formula of $Li_{1+x}Me_aO_{2+b}$ (in the formula, x, a, and b satisfy x+a=1, $-0.2 \leq x \leq 0.2$, $-0.1 \leq b \leq 0.1$, and Me includes at least one element selected from the group consisting of a transition metal element, an alkali metal element, an alkaline earth metal element, a group 12 element, a group 13 element, and a group 14 element). In particular, in the lithium transition metal oxide, in view of the structural stability and the formal valence, Me in the above formula preferably includes Ni (nickel), Co (cobalt), and Mn (manganese) and, furthermore, the content of Mn which is particularly important among Ni, Co, and Mn for structural stabilization in an overcharged state is more preferably 10 percent by mole or more with respect to the total amount of the transition metal in the lithium transition metal oxide. In addition, in view of the structure stability in an overcharged state, Me in the above formula preferably further includes zirconia (Zr) and/or tungsten (W).

The lithium transition metal oxide is preferably formed, for example, of grains having an average grain diameter of 2 to 30 μm. Although the grains of the lithium transition metal oxide may be either primary grains or secondary grains, for example, secondary grains having an average grain diameter of 2 to 30 μm formed by bonding of primary grains having an average grain diameter of 100 nm to 10 μm are preferable. The average grain diameter can be obtained in such a way that the positive electrode active material grains are observed by a scanning electron microscope (SEM), and for example, grain diameters of several tens of grains are each measured.

As the positive electrode active material, besides the lithium transition metal oxide described above, a different positive electrode active material may also be used. In addition, the different positive electrode active material is not particularly limited as long as being capable of reversibly occluding and releasing lithium ions, and for example, there may be used a compound having a layered structure, a spinel structure, or an olivine structure which is able to occlude and release lithium ions while a stable crystalline structure is maintained. In addition, either in the case in which positive electrode active materials belonging to the same type are only used or in the case in which different types of positive electrode active materials are used, as the positive electrode active materials, materials having the same grain diameter may be used, or materials having different grain diameters may also be used.

As the electrically conductive agent, for example, carbon material, such as carbon black, acetylene black, ketchen black, or graphite, may be mentioned. Those compounds may be used alone, or at least two types thereof may be used in combination.

As the binder, for example, a fluorinated high molecular weight material or a rubber-based high molecular weight material may be mentioned. As the fluorinated high molecular weight material, for example, a polytetrafluoroethylene (PTFE), a poly(vinylidene fluoride) (PVdF), or a modified product thereof may be mentioned, and as the rubber-based high molecular weight material, for example, an ethylene-propylene-isoprene copolymer or an ethylene-propylene-butadiene copolymer may be mentioned. Those compounds may be used alone, or at least two types thereof may be used in combination. In addition, the binder may be used together with a thickening agent, such as a carboxymethyl cellulose (CMC) or a poly(ethylene oxide) (PEO).

<Negative Electrode>

As the negative electrode 34, a negative electrode which has been known in the past may be used, and for example, the negative electrode 34 may be obtained in such a way that for example, after a negative electrode active material, a binder, water, and an appropriate solvent are mixed with each other, this mixture is applied on a negative electrode collector, followed by performing drying and rolling. For the negative electrode collector, a thin film having an electric conductivity may be used, and in particular, for example, metal foil or alloy foil which is formed from copper or the like stable in a negative electrode potential range or a film having a metal surface layer formed from copper or the like is preferably used. As the binder, although a PTFE or the like may be used as is the case of the positive electrode, a styrene-butadiene copolymer (SBR), a modified product thereof, or the like is preferably used. The binder may be used together with a thickening agent, such as a CMC.

As the negative electrode active material, any material may be used without any particular restriction as long as being capable of reversibly occluding and releasing lithium ions, and for example, a carbon material, a metal capable of forming an alloy with lithium, or an alloy compound containing the metal mentioned above may be mentioned. As the carbon material, for example, natural graphite, non-graphitizing carbon, graphite, such as artificial graphite, or coke may be used. As the alloy compound, a compound containing at least one metal capable of forming an alloy with lithium may be mentioned. In particular, as an element capable of forming an alloy with lithium, silicon or tin is preferable, and for example, silicon oxide or tin oxide may also be used which contains the metal mentioned above and oxygen bonded thereto. In addition, a product formed by mixing the carbon material mentioned above with a silicon or a tine compound may also be used. Besides those materials mentioned above, there may also be used a material, such as lithium titanate, having a high charge and discharge potential with reference to metal lithium as compared to that of a carbon material or the like.

<Non-Aqueous Electrolyte>

The non-aqueous electrolyte contains a non-aqueous solvent and an electrolyte salt dissolved therein. As the non-aqueous solvent, a non-aqueous solvent which has been known in the past may be used, and for example, there may be mentioned a cyclic carbonate, such as ethylene carbonate, propylene carbonate, butylene carbonate, or vinylene carbonate; or a chain carbonate, such as dimethyl carbonate, methyl ethyl carbonate, or diethyl carbonate. In particular, in view of a high dielectric constant, a low viscosity, and a low melting point, as a non-aqueous solvent having a high lithium ion conductivity, a mixed solvent of a cyclic carbonate and a chain carbonate is preferably used. In addition, the volume ratio of the cyclic carbonate to the chain carbonate in this mixed solvent is preferably controlled in a range of 2:8 to 5:5.

In addition, together with the solvents mentioned above, for example, there may also be used a compound containing an ester, such as methyl acetate, ethyl acetate, propyl acetate, methyl propionate, ethyl propionate, or γ-butyrolactone; a compound containing a sulfonic group, such as propane sultone; a compound containing an ether, such as 1,2-dimethoxyethane, 1,2-diethoxyethane, tetrahydrofuran, 1,3-dioxane, 1,4-dioxane, or 2-methyltetrahydrofurane; a compound containing a nitrile, such as butyronitrile, valeronitrile, n-heptane nitrile, succinonitrile, glutaronitrile, adiponitrile, pimelonitrile, 1,2,3-propane tricarbonitrile, or 1,3,5-pentane tricarbonitrile, or a compound containing an amide, such as dimethylformamide. In addition, a solvent in which at least one hydrogen atom H of each of those solvents mentioned above is substituted by a fluorine atom F may also be used.

As the electrolyte salt of the non-aqueous electrolyte, an electrolyte salt which has been used in the past may be used, and for example, $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, and $LiAsF_6$, each of which is a fluorine-containing lithium salt, may be mentioned. Furthermore, there may also be used an electrolyte salt which is prepared by adding to a fluorine-containing lithium salt, a lithium salt other than a fluorine-containing lithium salt (a lithium salt (such as $LiClO_4$) containing one element selected from P, B, O, S, N, and Cl). In particular, since a stable film is formed on the surface of the negative electrode even in a high-temperature environment, a fluorine-containing lithium salt and a lithium salt using an oxalato complex as an anion are preferably contained.

In addition, as the lithium salt using an oxalato complex as an anion, for example, there may be mentioned LiBOB [lithium-bis(oxalate)borate], $Li[B(C_2O_4)F_2]$, $Li[P(C_2O_4)F_4]$, or $Li[P(C_2O_4)_2F_2]$. Among those mentioned above, in particular, LiBOB which forms a stable film on the negative electrode is preferably used. In addition, those electrolyte salts mentioned above may be used alone, or at least two types thereof may be used by mixing.

<Separator>

As the separator 36, a separator which has been used in the past may be used, and for example, a polypropylene-made or a polyethylene-made separator, a polypropylene-polyethylene multilayer separator, or a product formed by applying a resin, such as an aramid resin, on a surface of a separator may be mentioned.

In addition, at the interface between the positive electrode 32 and the separator 36, or at the interface between the negative electrode 34 and the separator 36, a layer formed from an inorganic filler which has been used in the past may be formed. As the filler, an oxide or a phosphoric acid compound formed by using at least one of titanium, aluminum, silicon, magnesium, and the like, each of which has been used in the past, may be used, or a product obtained by treating the surface thereof using a hydroxide or the like may also be used. As a method for forming the filler layer described above, for example, there may be mentioned a method in which a filler-containing slurry is directly applied to the positive electrode 32, the negative electrode 34, or the separator 36 or a method in which a sheet formed from a filler is adhered to the positive electrode 32, the negative electrode 34, or the separator 36.

EXAMPLES

Hereinafter, the embodiment of the present invention will be further described in detail with reference to experimental examples. However, the following experimental examples are described by way of example in order to explain examples of a non-aqueous electrolyte secondary battery positive electrode, a non-aqueous electrolyte secondary battery, and a non-aqueous electrolyte secondary battery positive electrode active material, each of which is configured to realize the technical scope of the present invention, and the present invention is not limited thereto. The present invention may be appropriately modified without departing from the scope thereof.

Experimental Example 1

[Formation of Positive Electrode Active Material]

First, a nickel cobalt manganese composite hydroxide represented by $[Ni_{0.50}Co_{0.2}Mn_{0.30}](OH)_2$ obtained by co-precipitation was fired at 500° C., so that a nickel cobalt manganese composite oxide was obtained. Next, lithium hydroxide, zirconium oxide, and tungsten oxide were mixed together using an Ishikawa-type grinding mortar. The mixing ratio was set so that the total amount of Ni, Co, and Mn:Li:Zr:W was 1:1.15:0.005:0.005. Subsequently, this mixture was fired at 900° C. for 10 hours in an air atmosphere and was pulverized, so that a lithium nickel manganese cobalt composite oxide represented by $Li_{1.07}[Ni_{0.461}Co_{0.184}Mn_{0.275}Zr_{0.005}W_{0.005}]O_2$ having an average secondary grain diameter of approximately 4 μm was obtained. The compound thus obtained was used as a positive electrode active material.

[Formation of Positive Electrode]

The above positive electrode active material, carbon black functioning as an electrically conductive agent, and a N-methyl-2-pyrrolidone solution in which a poly(vinylidene fluoride) functioning as a binder was dissolved were weighed so that the mass ratio of the positive electrode active material, the electrically conductive agent, and the binder was 91:7:2 and were then kneaded with each other (slurry mixing step 1). Furthermore, tungsten oxide and lithium phosphate were mixed with the slurry obtained after the kneading at a predetermined ratio (slurry mixing step 2), so that a positive electrode mixture slurry was prepared.

Next, after the above positive electrode mixture slurry was applied to one surface of a positive electrode collector formed of aluminum foil and then dried, rolling was performed using a rolling roller machine, and an aluminum-made collector tab was further fitted, so that a positive electrode plate in which a positive electrode active material layer was formed on one surface of the positive electrode collector was formed. In addition, the amount of tungsten oxide in the positive electrode active material layer thus formed was 0.5 percent by mole with respect to the total amount of the transition metal of the positive electrode active material, and the amount of lithium phosphate in the positive electrode active material layer was 2 percent by weight with respect to the total amount of the positive electrode active material.

When the positive electrode thus obtained was observed by a scanning electron microscope (SEM), an electrically conductive agent in contact with the positive electrode active material, tungsten oxide having an average grain diameter of 150 nm in contact with the electrically conductive agent, and lithium phosphate having an average grain diameter of 5 μm in contact with the electrically conductive agent and not in contact with the positive electrode active material were confirmed.

In addition, the rate of the lithium phosphate in contact with the surface of the electrically conductive agent and not in contact with the positive electrode active material (non-contact rate of lithium phosphate) was 97% with respect to the total amount of the lithium phosphate contained in the positive electrode active material layer. The non-contact rate of lithium phosphate was obtained by the method described above.

Figure 5:
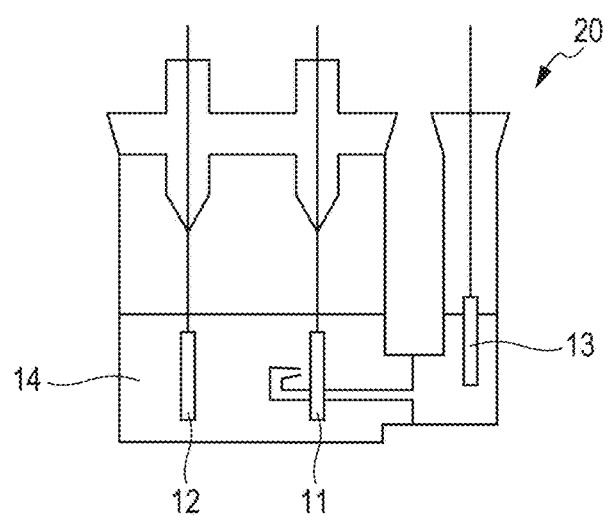
FIG. 5 is a schematic view of a three-electrode type test cell used in each experiment example.

FIG. 5 is a schematic view of a three-electrode type test cell used in the experimental example. As shown in FIG. 5, a three-electrode type test cell 20 including a working electrode 11 functioning as a positive electrode formed as described above, a counter electrode 12 functioning as a negative electrode, and a reference electrode 13 formed of metal lithium was formed. In the three-electrode type test cell 20, the following non-aqueous electrolyte 14 was charged. The non-aqueous electrolyte 14 was an electrolyte in which $LiPF_6$ was dissolved in a mixed solvent containing ethylene carbonate, methyl ethyl carbonate, and dimethyl carbonate at a volume ratio of 3:3:4 to have a concentration of 1.2 mol/L.

Experimental Example 2

A positive electrode active material was formed in a manner similar to that of Experimental Example 1. In addition, for the formation of a positive electrode, after a predetermined amount of tungsten oxide was mixed with the positive electrode active material (powder mixing), the positive electrode active material, an electrically conductive agent, and a binder were kneaded with each other at a mass ratio similar to that of Experimental Example 1 (slurry mixing step 1). With the slurry obtained after the kneading, lithium phosphate was mixed at a predetermined ratio (slurry mixing step 2), so that a positive electrode mixture slurry was prepared. In addition, as was the case of Experimental Example 1, a three-electrode type test cell was formed. The amount of tungsten in the positive electrode active material layer of Experimental Example 2 was 0.5 percent by mole with respect to the total amount of the transition metal of the positive electrode active material, and the amount of lithium phosphate in the positive electrode active material layer was 2 percent by weight with respect to the mass of the positive electrode active material.

When the positive electrode obtained in Experimental Example 2 was observed by a scanning electron microscope (SEM), an electrically conductive agent in contact with the positive electrode active material, tungsten oxide having an average grain diameter of 150 nm in contact with the positive electrode active material, and lithium phosphate having an average grain diameter of 5 μm in contact with the electrically conductive agent and not in contact with the positive electrode active material were confirmed. In addition, it was confirmed that the electrically conductive agent in contact with the positive electrode active material, an electrically conductive agent not in contact with the positive electrode active material, and the like were in contact with the tungsten oxide. Furthermore, lithium phosphate in contact with the electrically conductive agent in contact with the tungsten oxide and not in contact with the positive electrode active material was also confirmed.

In addition, the rate of the lithium phosphate in contact with the surface of the electrically conductive agent and not in contact with the surface of the positive electrode active material was 96% with respect to the total amount of the lithium phosphate contained in the positive electrode active material layer.

Experimental Example 3

A positive electrode active material was formed in a manner similar to that of Experimental Example 1. In addition, for the formation of a positive electrode, after predetermined amounts of tungsten oxide and lithium phosphate were mixed with the positive electrode active material (powder mixing), the positive electrode active material, an electrically conductive agent, and a binder were kneaded with each other at a mass ratio similar to that of Experimental Example 1 (slurry mixing step 1), so that a positive electrode mixture slurry was prepared. In addition, as was the case of Experimental Example 1, a three-electrode type test cell was formed. The amount of tungsten in the positive electrode active material layer of Experimental Example 3 was 0.5 percent by mole with respect to the total amount of the transition metal of the positive electrode active material, and the amount of lithium phosphate in the positive electrode active material layer was 2 percent by weight with respect to the mass of the positive electrode active material.

When the positive electrode obtained in Experimental Example 3 was observed by a scanning electron microscope (SEM), an electrically conductive agent, tungsten oxide having an average grain diameter of 150 nm, and lithium phosphate having an average grain diameter of 5 μm, each of which was in contact with the surface of the positive electrode active material (lithium transition metal oxide), were confirmed. Furthermore, the rate of lithium phosphate in contact with the electrically conductive agent and not in contact with the positive electrode active material was 3% with respect to the total amount of the lithium phosphate contained in the positive electrode active material layer.

Experimental Example 4

A positive electrode active material was formed in a manner similar to that of Experimental Example 1. In addition, for the formation of a positive electrode, the positive electrode active material, an electrically conductive agent, and a binder were kneaded with each other at a mass ratio similar to that of Experimental Example 1 (slurry mixing step 1). Furthermore, with the slurry obtained after the kneading, lithium phosphate was mixed at a predetermined ratio (slurry mixing step 2), so that a positive electrode mixture slurry was prepared. In addition, as was the case of Experimental Example 1, a three-electrode type test cell was formed. The amount of lithium phosphate in the positive electrode active material layer of Experimental Example 4 was 2 percent by weight with respect to the mass of the positive electrode active material.

When the positive electrode obtained in Experimental Example 4 was observed by a scanning electron microscope (SEM), an electrically conductive agent in contact with the surface of the positive electrode active material was confirmed. In addition, lithium phosphate having an average grain diameter of 5 μm in contact with the surface of the electrically conductive agent but not in contact with the surface of the positive electrode active material was confirmed. Furthermore, the rate of the lithium phosphate in contact with the electrically conductive agent and not in contact with the positive electrode active material was 98% with respect to the total amount of the lithium phosphate contained in the positive electrode active material layer.

Experimental Example 5

A positive electrode active material was formed in a manner similar to that of Experimental Example 1. In addition, for the formation of a positive electrode, the positive electrode active material, an electrically conductive agent, and a binder were kneaded with each other at a mass ratio similar to that of Experimental Example 1 (slurry mixing step 1). Furthermore, with the slurry obtained after the kneading, tungsten oxide was mixed at a predetermined ratio (slurry mixing step 2), so that a positive electrode mixture slurry was prepared. In addition, as was the case of Experimental Example 1, a three-electrode type test cell was formed. The amount of tungsten in the positive electrode active material layer of Experimental Example 5 was 0.5 percent by mole with respect to the total amount of the transition metal of the positive electrode active material.

When the positive electrode obtained in Experimental Example 5 was observed by a scanning electron microscope (SEM), an electrically conductive agent in contact with the surface of the positive electrode active material was confirmed. In addition, tungsten oxide having an average grain diameter of 150 nm in contact with the electrically conductive agent and not in contact with the positive electrode active material was confirmed.

Experimental Example 6

A positive electrode active material was formed in a manner similar to that of Experimental Example 1. In addition, for the formation of a positive electrode, after a predetermined amount of tungsten oxide was mixed with the positive electrode active material (powder mixing), the positive electrode active material, an electrically conductive agent, and a binder were kneaded with each other at a mass ratio similar to that of Experimental Example 1(slurry mixing step 1), so that a positive electrode mixture slurry was prepared. In addition, as was the case of Experimental Example 1, a three-electrode type test cell was formed. The amount of tungsten in the positive electrode active material layer of Experimental Example 6 was 0.5 percent by mole with respect to the total amount of the transition metal of the positive electrode active material.

When the positive electrode obtained in Experimental Example 6 was observed by a scanning electron microscope (SEM), an electrically conductive agent and tungsten oxide having an average grain diameter of 150 nm, each of which was in contact with the surface of the positive electrode active material, were confirmed. An electrically conductive agent in contact with the tungsten oxide was confirmed.

Experimental Example 7

A positive electrode active material was formed in a manner similar to that of Experimental Example 1. In addition, for the formation of a positive electrode, the positive electrode active material, an electrically conductive agent, and a binder were kneaded with each other at a mass ratio similar to that of Experimental Example 1 (slurry mixing step 1), so that a positive electrode mixture slurry was prepared. In addition, as was the case of Experimental Example 1, a three-electrode type test cell was formed.

When the positive electrode obtained in Experimental Example 7 was observed by a scanning electron microscope (SEM), an electrically conductive agent in contact with the surface of the positive electrode active material (lithium transition metal oxide) was confirmed.

<Overcharge-Discharge Test>

The three-electrode type test cell (20 mAh, 4.3 V (vs. Li/Li$^+$)) of each experimental example was placed in a temperature environment at 25° C., and a constant current charge was performed at a current of 20 mA to 5.1 V (vs. Li/Li+), and constant voltage charge was then performed at a constant voltage of 5.1 V (vs. Li/Li$^+$) to a current density of 1 mA. Subsequently, constant current discharge was performed at a current of 6.7 mA to 2.5 V (vs. Li/Li$^+$).

<Measurement of Resistance>

The resistance of the three-electrode type test cell after the charge-discharge test was measured using a direct current resistance meter. The resistance of Experimental Example 1 was assumed as "100", and a relative resistance of each of Experimental Examples 2 to 7 was calculated by the following formula.

Resistance (relative percentage)=(resistance of each of Experimental Examples 2 to 7)/(resistance of Experimental Example 1)

In the case of overcharge, when the side reaction (decomposition reaction) of the electrolyte solution is dominant, by a side reaction product, the resistance in the battery is remarkably increased. That is, a higher resistance (relative value) obtained by the above formula indicates that the decomposition reaction of the electrolyte solution becomes dominant.

In Table 1, the mixing conditions when the positive electrode mixture slurry is formed, the contact positions of tungsten oxide and lithium phosphate, the non-contact rate of lithium phosphate, and the resistance are collectively shown.

TABLE 1

| | Positive Electrode Active Material | Powder Mixing WO₃ (mol %) | Powder Mixing Li₃PO₄ (Wt %) | Slurry Mixing Step 1 Electrically Conductive Agent (wt %) | Slurry Mixing Step 1 Binder (Wt %) | Slurry Mixing Step 2 WO₃ (mol %) | Slurry Mixing Step 2 Li₃PO₄ (Wt %) | Position of WO₃ Surface of Positive Electrode Active Material or Electrically Conductive Agent | Position of Li₃PO₄ | Resistance (Relative Value %) | Non-Contact Rate of Li₃PO₄ (%) |
|---|---|---|---|---|---|---|---|---|---|---|---|
| Experimental Example 1 | LiNiCoMnZrW | — | — | 7 | 2 | 0.5 | 2 | Electrically Conductive Agent (Positive Electrode Active Material) | Electrically Conductive Agent (Positive Electrode Active Material) | 100 | 97 |
| Experimental Example 2 | LiNiCoMnZrW | 0.5 | — | 7 | 2 | — | 2 | Positive Electrode Active Material | Electrically Conductive Agent (Positive Electrode Active Material) | 101 | 96 |
| Experimental Example 3 | LiNiCoMnZrW | 0.5 | 2 | 7 | 2 | — | — | Positive Electrode Active Material | Positive Electrode Active Material | 164 | 3 |
| Experimental Example 4 | LiNiCoMnZrW | — | — | 7 | 2 | — | 2 | — | Electrically Conductive Agent (Positive Electrode Active Material) | 138 | 98 |
| Experimental Example 5 | LiNiCoMnZrW | — | — | 7 | 2 | 0.5 | — | Electrically Conductive Agent (Positive Electrode Active Material) | — | 587 | — |
| Experimental Example 6 | LiNiCoMnZrW | 0.5 | — | 7 | 2 | — | — | Positive Electrode Active Material | — | 608 | — |
| Experimental Example 7 | LiNiCoMnZrW | — | — | 7 | 2 | — | — | — | — | 535 | — |

*Composition of Positive Electrode Active Material; $Li_{1.070}[Ni_{0.461}Co_{0.184}Mn_{0.275}Zr_{0.005}W_{0.005}]O_2$ As apparent from the results shown in Table 1, in Experimental Examples 1 and 2, the increase in resistance after the overcharge-discharge test was significantly suppressed as compared to that of each of Experimental Examples 3 to 7. In Experimental Examples 1 and 2, the tungsten oxide is in contact with the positive electrode active material or the electrically conductive agent, and the lithium phosphate is in contact with the electrically conductive agent but is not in contact with the positive electrode active material. In Experimental Example 3, although the tungsten oxide is in contact with the positive electrode active material as is the case of Experimental Example 2, the lithium phosphate is also in contact with the positive electrode active material. In Experimental Example 4, although the lithium phosphate is in contact with the electrically conductive agent and is not in contact with the positive electrode active material, no tungsten oxide is contained. In Experimental Examples 5 and 6, although the tungsten oxide is in contact with the positive electrode active material or the electrically conductive agent, no lithium phosphate is contained. In Experimental Example 7, neither tungsten oxide nor lithium phosphate is contained.

The reasons the above results were obtained are considered as follows. In the case of Experimental Examples 1 and 2 in which although the tungsten oxide is in contact with the positive electrode active material or the electrically conductive agent, and the lithium phosphate is in contact with the electrically conductive agent, the lithium phosphate is not in contact with the positive electrode active material, it is believed that by a specific interaction between the lithium phosphate and the tungsten oxide, the reverse catalytic function of the tungsten oxide works, the activity of the electrically conductive agent is decreased, and the decomposition reaction of the electrolyte solution caused, for example, by the reaction between the electrically conductive agent and the electrolyte solution is suppressed. Furthermore, it is also believed that since the lithium phosphate is in contact with the electrically conductive agent, the area at which the electrically conductive agent and the electrolyte solution are in direct contact with each is decreased, and the decomposition reaction of the electrolyte solution caused, for example, by the reaction between the electrically conductive agent and the electrolyte solution is suppressed. However, in Experimental Example 3 in which although the tungsten oxide is in contact with the positive electrode active material, the lithium phosphate is also in contact with the positive electrode active material, it is believed that the reverse catalytic function of the tungsten oxide cannot be sufficiently obtained. In addition, it is believed that since the lithium phosphate is in contact with the surface of the positive electrode active material, the area at which the electrically conductive agent and the electrolyte solution are in direct contact with each other is increased as compared to that of each of Experimental Examples 1 and 2, and the decomposition reaction of the electrolyte solution caused, for example, by the reaction between the electrically conductive agent and the electrolyte solution cannot be sufficiently suppressed. In addition, in the case of Experimental Example 4 in which the lithium phosphate is only contained, it is believed that since the interaction described above between tungsten oxide and lithium phosphate cannot be obtained, the decomposition reaction of the electrolyte solution caused, for example, by the reaction between the electrically conductive agent and the electrolyte solution cannot be sufficiently suppressed. Furthermore, in Experimental Examples 5 and 6 in each of which the tungsten oxide is only contained and in Experimental Example 7 in which neither tungsten oxide nor lithium phosphate is contained, it is believed that since no lithium phosphate is present, the reverse catalytic function of the tungsten oxide hardly works, and the decomposition reaction of the electrolyte solution caused, for example, by the reaction between the electrically conductive agent and the electrolyte solution cannot be suppressed.

Experimental Examples 8 to 10

A positive electrode active material was formed in a manner similar to that of Experimental Example 1. In addition, for the formation of a positive electrode, after predetermined amounts of tungsten oxide and lithium phosphate were mixed with the positive electrode active material (powder mixing), the positive electrode active material, an electrically conductive agent, and a binder were kneaded with each other at a mass ratio similar to that of Experimental Example 1 (slurry mixing step 1). With the slurry obtained after the kneading, lithium phosphate was further mixed at a predetermined ratio (slurry mixing step 2), so that a positive electrode mixture slurry was prepared. In addition, as was the case of Experimental Example 1, a three-electrode type test cell was formed. The amount of tungsten in the positive electrode active material layer of each of Experimental Examples 8 to 10 was 0.5 percent by mole with respect to the total amount of the transition metal of the positive electrode active material, and that the amounts of lithium phosphate in the positive electrode active material layers were with respect to the mass of the positive electrode active material, 0.8, 1, and 1.2 percent by weight in Experimental Examples 8, 9, and 10, respectively.

When the positive electrode obtained in each of Experimental Examples 8 to 10 was observed by a scanning electron microscope (SEM), lithium phosphate in contact with the surface of the positive electrode active material (lithium transition metal oxide), and lithium phosphate having an average grain diameter of 5 μm in contact with the surface of the electrically conductive agent and not in contact with the surface of the positive electrode active material were confirmed.

In Experimental Examples 8 to 10, the rates of the lithium phosphate in contact with the surface of the electrically conductive agent and not in contact with the surface of the positive electrode active material were with respect to the total amount of the lithium phosphate contained in the positive electrode active material layer, 58% (Experimental Example 8), 50% (Experimental Example 9), and 36% (Experimental Example 10).

<Charge-Discharge Efficiency>

In the three-electrode type test cell of each of Experimental Examples 8 to 10, the overcharge-discharge test described above was performed, so that a charge-discharge efficiency was obtained. In addition, as described above, the charge-discharge efficiency of the three-electrode type test cell of each of Experimental Examples 2 and 3 was also obtained. In addition, the charge-discharge efficiency of Experimental Example 2 was assumed as "100", and the relative values of Experimental Examples 3 and 8 to 10 were calculated based on the following formula.

Charge-Discharge Efficiency (relative percentage)= (charge-discharge efficiency of each of Experimental Examples 3 and 8 to 10/charge-discharge efficiency of Experimental Example 2)

In the case of overcharge, when the side reaction (decomposition reaction) of the electrolyte solution is dominant, by a side reaction product, the resistance in the battery is remarkably increased, and the charge-discharge efficiency is also decreased. That is, a lower charge-discharge efficiency obtained by the above formula indicates that the decomposition reaction of the electrolyte solution becomes dominant.

In Table 2, the mixing conditions when the positive electrode mixture slurry is formed, the contact positions of tungsten oxide and lithium phosphate, the non-contact rate of lithium phosphate, and the charge-discharge efficiency are collectively shown.

TABLE 2

| | Positive Electrode Active Material | Slurry Mixing Step 1 | | | | Slurry Mixing Step 2 | | Position of $WO_3$ Surface of Positive Electrode Active Material or Electrically Conductive Agent | Position of $Li_3PO_4$ | Charge-Discharge Efficiency (Relative Value %) | Non-Contact Rate of $Li_3PO_4$ (%) |
|---|---|---|---|---|---|---|---|---|---|---|---|
| | | Powder Mixing | | Electrically Conductive Agent (wt %) | Binder (Wt %) | | | | | | |
| | | $WO_3$ (mol %) | $Li_3PO_4$ (Wt %) | | | $WO_3$ (mol %) | $Li_3PO_4$ (Wt %) | | | | |
| Experimental Example 2 | LiNiCoMnZrW | 0.5 | — | 7 | 2 | — | 2 | Positive Electrode Active Material | Electrically Conductive Agent (Positive Electrode Active Material) | 100 | 96 |
| Experimental Example 8 | LiNiCoMnZrW | 0.5 | 0.8 | 7 | 2 | — | 1.2 | Positive Electrode | Electrically Conductive | 97 | 58 |

TABLE 2-continued

| | Positive Electrode Active Material | Slurry Mixing Step 1 | | | | Slurry Mixing Step 2 | | Position of WO₃ Surface of Positive Electrode Active | Position of Li₃PO₄ | Charge-Discharge Efficiency | Non-Contact Rate of |
| | | Powder Mixing | | Electrically Conductive | | | | | | | |
| | | WO₃ (mol %) | Li₃PO₄ (Wt %) | Agent (wt %) | Binder (Wt %) | WO₃ (mol %) | Li₃PO₄ (Wt %) | Material or Electrically Conductive Agent | | (Relative Value %) | Li₃PO₄ (%) |
|---|---|---|---|---|---|---|---|---|---|---|---|
| Experimental Example 9 | LiNiCoMnZrW | 0.5 | 1 | 7 | 2 | — | 1 | Active Material Positive Electrode Active Material | Agent (Positive Electrode Active Material) Electrically Conductive Agent Positive Electrode Active Material | 93 | 50 |
| Experimental Example 10 | LiNiCoMnZrW | 0.5 | 1.2 | 7 | 2 | — | 0.8 | Positive Electrode Active Material | (Electrically Conductive Agent) Positive Electrode Active Material | 75 | 36 |
| Experimental Example 3 | LiNiCoMnZrW | 0.5 | 2 | 7 | 2 | — | — | Positive Electrode Active Material | (Electrically Conductive Agent) Positive Electrode Activ Material | 45 | 3 |

*Composition of Positive Electrode Active Material: $Li_{1.070}[Ni_{0.461}Co_{0.184}Mn_{0.275}Zr_{0.005}W_{0.005}]O_2$ As apparent from Table 2, in Experimental Examples 2, 8, and 9 in each of which the non-contact rate of the lithium phosphate is 50% or more, compared to the case of Experimental Examples 3 and 10 in which the non-contact rate of the lithium phosphate is less than 50%, the charge-discharge efficiency is 90% or more. That is, it can be said that when the non-contact rate of the lithium phosphate is set to 50% or more, the decomposition reaction of the electrolyte solution can be further suppressed.

INDUSTRIAL APPLICABILITY

The non-aqueous electrolyte secondary battery positive electrode according to one aspect of this embodiment and the non-aqueous electrolyte secondary battery using the positive electrode described above may be used, for example, for a drive power source of a mobile information terminal, such as a mobile phone, a notebook personal computer, a smart phone, or a tablet terminal, which particularly requires a high energy density. Furthermore, high output application, such as an electric vehicle (EV), a hybrid electric vehicle (HEV or PHEV), or an electric tool, may also be expected to be developed.

REFERENCE SIGNS LIST

1 non-aqueous electrolyte secondary battery, 11 working electrode, 12 counter electrode, 13 reference electrode, 14 non-aqueous electrolyte, 20 three-electrode type test cell, 30 non-aqueous electrolyte secondary battery, 32 positive electrode, 34 negative electrode, 36 non-aqueous electrolyte secondary battery separator, 38 battery case, 40 sealing plate, 42 upper insulating plate, 44 lower insulating plate, 46 positive electrode lead, 48 positive electrode terminal, 50 negative electrode lead, 52 electrically conductive agent, 54 positive electrode active material, 56 tungsten compound, 58 phosphoric acid compound

The invention claimed is:

1. A non-aqueous electrolyte secondary battery positive electrode comprising:
   a positive electrode active material layer which includes:
      a positive electrode active material containing a lithium transition metal oxide;
      a tungsten compound;
      a phosphoric acid compound not in contact with the positive electrode active material; and
      an electrically conductive agent in contact with the tungsten compound and the phosphoric acid compound.

2. The non-aqueous electrolyte secondary battery positive electrode according to claim 1, wherein at least one of the electrically conductive agent and the tungsten compound is in contact with the positive electrode active material.

3. The non-aqueous electrolyte secondary battery positive electrode according to claim 1, wherein a rate of the phosphoric acid compound in contact with the electrically conductive agent and not in contact with the positive electrode active material is 50% or more with respect to the total amount of a phosphoric acid compound contained in the positive electrode active material layer.

4. The non-aqueous electrolyte secondary battery positive electrode according to claim 1,
   wherein the lithium transition metal oxide is represented by a general formula of $Li_{1+x}Me_aO_{2+b}$,
   in the formula, x, a, and b satisfy x+a=1, −0.2≤x≤0.2, and −0.1≤b≤0.1, and Me includes at least one element selected from the group consisting of a transition metal element, an alkali metal element, an alkaline earth metal element, a group 12 element, a group 13 element, and a group 14 element, and the Me in the general formula includes Ni, Co, and Mn, and the content of the Mn is 10 percent by mole or more with respect to the total amount of the transition metal in the lithium transition metal oxide.

5. The non-aqueous electrolyte secondary battery positive electrode according to claim 4, wherein the Me in the general formula includes Zr.

6. The non-aqueous electrolyte secondary battery positive electrode according to claim 4, wherein the Me in the general formula includes W.

7. The non-aqueous electrolyte secondary battery positive electrode according to claim 1, wherein the phosphoric acid compound is lithium phosphate.

8. The non-aqueous electrolyte secondary battery positive electrode according to claim 1, wherein the tungsten compound is $WO_3$.

9. A non-aqueous electrolyte secondary battery comprising: the non-aqueous electrolyte secondary battery positive electrode according to claim 1.

* * * * *